Figure 1:
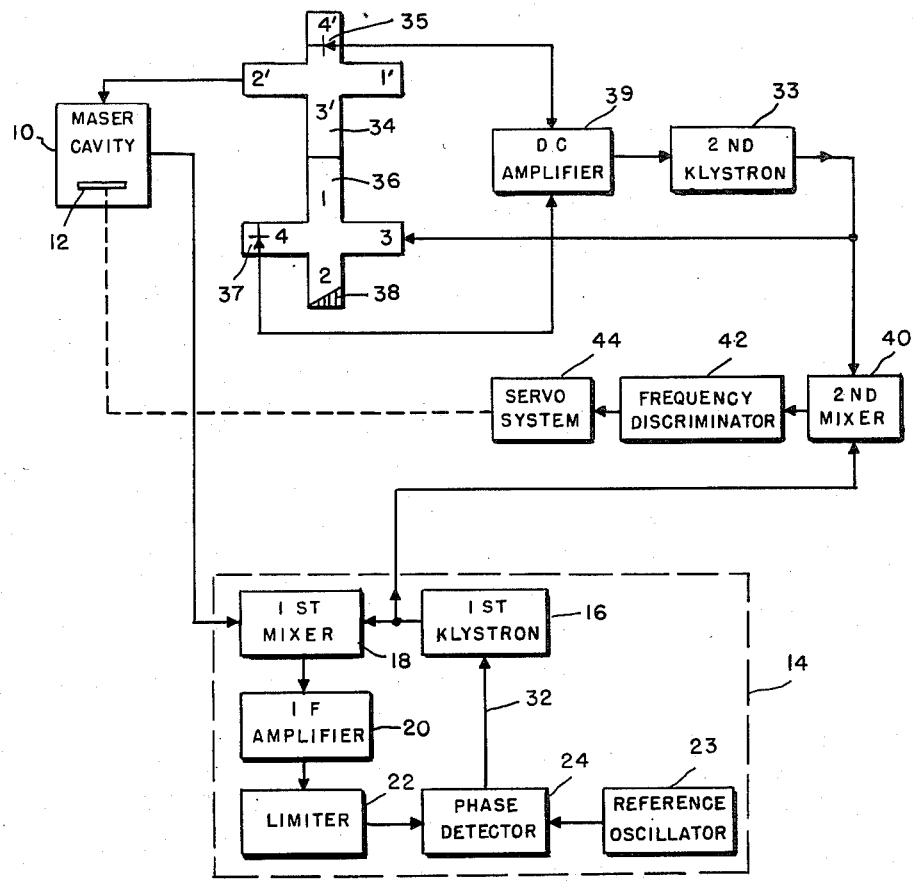

April 19, 1960   F. H. REDER ET AL   2,933,696
STABILIZATION OF A MASER CAVITY
Filed Dec. 23, 1958

*INVENTOR,*
FRIEDRICH H. REDER
FRIEDRICH O. VONBUN
GERNOT M. R. WINKLER

BY, *Harry M. Saragovitz*
*ATTORNEY.*

United States Patent Office 2,933,696
Patented Apr. 19, 1960

2,933,696
STABILIZATION OF A MASER CAVITY

Friedrich H. Reder, Friedrich O. Vonbun, and Gernot M. R. Winkler, Long Branch, N.J., assignors to the United States of America as represented by the Secretary of the Army Application December 23, 1958, Serial No. 782,606

9 Claims. (Cl. 331—2)

(Granted under Title 35, U.S. Code (1952), sec. 266)

The invention described herein may be manufactured and used by or for the Government for governmental purposes, without the payment of any royalty thereon.

This invention relates to automatic microwave frequency stabilization systems and more particularly to systems for stabilizing the transition frequency of molecular or atomic oscillators, or more generally, of a quantum mechanical oscillator using high Q cavity resonators.

In one type of molecular or atomic oscillator known as the maser, a stream of gas molecules, such as ammonia, is passed into a resonant cavity which must be tuned as close as possible to the output frequency. The resonant cavity is positioned and designed to receive the atoms or molecules having the greater of two energy levels. These atoms or molecules undergo energy level transitions within the resonator which results in an emissive effect at a frequency at which the atoms or molecules are resonant. Electromagnetic oscillations build up within the resonantor at this resonant frequency to provide an excited or active mode. The cavity output frequency is determined by the transition frequency of the energy emitted by molecular or submolecular particles during transitions from the higher to a lower energy state. In the past, frequency stability during continuous operation of the maser was inhibited by the pulling effects of a detuned cavity, caused by slight temperature changes, or by residual changes due to materials deposited within the cavity, or ageing or other effects of heavy shock or vibration, or residual change in dimensions after baking out the vacuum system. Since the changes in frequency are very small when compared to the output frequency, very sensitive circuits were needed to detect the error signal and, as a result, very complex circuitry has heretofore been required. Also in the past, variations in the cavity tuning have been reduced by maintaining a constant temperature, but this is extremely difficult and cumbersome since the temperature must be maintained constant within extremely close limits. Besides, this form of control does not compensate for the effect of material deposited in the cavity during operation and the effects of shock and vibrations, or from mechanical change.

It is therefore an object of the present invention to provide an improved system for stabilizing the frequency of a maser cavity which overcomes the aforesaid limitations.

It is another object of the present invention to provide a frequency stabilizing system for a maser cavity having improved accuracy and improved sensitivity.

In accordance with the present invention there is provided a circuit for controlling the tuning element of a maser type oscillator cavity resonator to stabilize the active oscillation therefrom at its characteristic emission line frequency. Included are first and second microwave oscillators adapted to generate frequencies in the range of the active maser emission line frequency. Further included are means responsive to the heterodyned output of the active maser oscillation frequency and the output of the first oscillator for maintaining the first oscillator frequency at a value which differs from the active frequency by a first prescribed IF frequency in phase-lock with the active frequency, and means responsive to a passive mode oscillation within said resonator close to the active oscillation mode and in circuit with the second oscillator for maintaining the output of the second oscillator in frequency-lock with the passive mode frequency. In addition there are included means in circuit with the tuning element of the cavity resonator and responsive to the heterodyned output of the first and second oscillator frequencies whereby there is produced an error signal when the heterodyned output frequency deviates from a second prescribed IF frequency which is produced only when the active maser oscillation is at its characteristic emission line frequency. The derived error signal is in a direction to correct the tuning of the maser cavity such that its active output is exactly at the emission line frequency.

Figure 2:
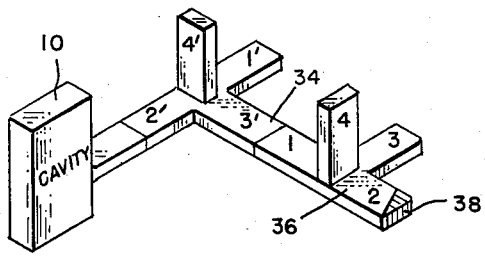

For a better understanding of the present invention, together with other and further objects thereof, reference is had to the following description taken in connection with the accompanying drawings in which:

Fig. 1 is a schematic block diagram of a preferred embodiment of the invention; and Fig. 2 illustrates the structure of the Magic-T's utilized in Fig. 1.

Referring now to Fig. 1 of the drawing, at 10 there is a maser type oscillator incorporating therein a cavity resonator which is adapted to provide the ammonia emission line at the frequency of 23,870 mc., hereinafter referred to as the active maser oscillator mode. It is characteristic of such maser oscillators that for any shift, $\delta f_c$, in the tuning of the cavity resonator, the maser output frequency will be shifted by approximately $10^{-3} \times \delta f_c$. Thus, if the cavity resonator were to be tuned such that it would resonate at $23,870 \pm 1$ mc., the active output of the maser will be only $23,870 \pm 1$ kc. Also, as is well known, the maser cavity resonator may also support passive modes within certain frequency limits determined by the parameters of the resonator so that both passive and active modes may oscillate simultaneously, but independently, at discrete frequencies within the cavity resonator. The passive mode oscillation may be one of the infinite number of frequencies at which the cavity will resonate other than the natural or active maser oscillation mode. This is a well known principle which is fully explained on pages 646–677 in volume 9 of the MIT Radiation Series entitled "Microwave Transmission Circuits." The significance of these factors will become apparent in the discussion below. The cavity of maser 10 may be conventionally tuned by means of a moveable dielectric plunger or rod 12 or by changing the cavity's temperature.

The active maser output frequency is applied through appropriate waveguide circuitry (not shown) to a phase sensitive detector system 14 adapted to provide a phase-lock between a first prescribed intermediate frequency and the active maser frequency output. This phase-lock system comprises a voltage-tuneable oscillator such as a first klystron 16, the output of which is heterodyned in a first mixer 18 with the maser frequency output to provide the first prescribed intermediate frequency. For example, klystron 16 may be turned to provide an oscillation frequency of 23,900 megacycles which heterodynes with the 23,870 mc. maser output frequency to provide a 30 mc. intermediate frequency signal from mixer 18. The difference frequency of 30 mc. in the output of the mixer 18 is amplified in the tuned amplifier 20 and then preferably limited in amplitude in a limiter 22. The output of the limiter is applied to a phase detector 24 to which is also applied a 30 mc. reference oscillation frequency from a stable oscillator 23 which may be of the crystal controlled type. The output of phase detector 24 is a unidirectional voltage having an amplitude dependent on the extent of phase departure of the klystron 16 signal from the maser output signal, and a polarity which is dependent upon the direction of said departure. The unidirectional voltage is applied through line 32 to a frequency controlling electrode such as the repeller of the klystron 16 (not shown), and will vary the frequency of the latter until it is phase-locked with the maser output. It is to be understood, of course, that any suitable phase-lock system other than that described above may be utilized to achieve the same result.

A passive oscillation mode in the cavity resonator of maser 10 close to, but higher than the active mode, is utilized to lock a second klystron 33 to the frequency of the passive oscillation mode within the cavity resonator of maser 10. As explained below, the frequency output of second klystron 33 is applied to maser cavity 10 through a suitable waveguide bridge so that possible oscillations at the selected klystron frequency are forced in the maser cavity. Of course the second klystron oscillation is coupled into and out of the maser cavity at an appropriate location therein apart from the active maser oscillation coupling source. In effect, maser cavity 10 is a resonator with two outputs, one being the passive mode of oscillation and the other the active or maser mode of oscillation. The principle of operation of such resonators is fully described in chapter VI of "Microwave Electronics" by Slater, published by D. Van Nostrand Company, Inc. (1950). It is to be understood of course that care should be taken so that the second klystron frequency does not fall at any of the ammonia ($NH_3$) emission frequencies in order to avoid any influence of the second klystron signal on the maser output. Any one of the well known methods of klystron frequency stabilization by means of cavities may be used. One such system includes two Magic-T's 34 and 36 having respective corresponding branches 1, 2, 3, 4, and 1', 2', 3', 4' arranged as shown in Fig. 2 and provided with crystal detectors 35 and 37 in the respective corresponding arms 4' and 4. The output of klystron oscillator 33 is fed into branch 3 of Magic-T 36 and divides equally between branches 1 and 2 thereof. The portion of klystron oscillation wave energy going down branch 2 is absorbed by an attenuator 38 while the wave energy in branch 1 enters branch 3' of Magic-T 34, and then divides again, this time between branches 1' and 2'. Branch 1' is terminated in a short circuit and is $\lambda/8$ longer than branch 2' which is terminated by the cavity of maser 10. When the wave energy reflected from the ends of 1' and 2' reach the junction of branches 3' and 4', each divides between branches 3' and 4' so that crystal detector 35 is subject to the vector sum of the two reflected waves that enter branch 4'. Similarly, crystal detector 37 is subjected to the vector sum of the two reflected waves entering 3', since the latter waves travel down branches 3' and 1 and divide between branches 3 and 4 when reaching the junction of branches 3 and 4. As is well known, the direct-current outputs of crystal detectors 35 are 37 and combined and amplied in direct-current amplifier 39 to provide a direct-current output voltage having a magnitude and polarity depending on the extent and direction that the frequency of glystron 33 deviates from the frequency of the passive mode in the cavity of maser 10. This direct-current voltage output is applied to second klystron 33 to correct the frequency thereof in such a manner as to reduce the deviation of the oscillator frequency from that of the passive mode oscillator in the cavity of maser resonator 10. As shown, the output of second klystron 33 is heterodyned with the output of first klystron 16 in a second mixer 40 to provide a second prescribed intermediate frequency, the output of which is applied to a frequency discriminator 42. Any deviation from the selected second intermediate frequency in the beat output from mixer 40 will produce a direct-current voltage output from discriminator 42 which is applied as a correction voltage to a servo system 44, the output of which is applied to tune the cavity of maser 10 in a direction such that the beat frequency from mixer 40 is at the selected second intermediate frequency.

In operation, the system is initially aligned so that the cavity of maser 10 is tuned to provide an output at the ammonia emission line frequency of 23,870 mc.; first klystron 16 is tuned to provide an output frequency 23,900 megacycles which is phase-locked with the 23,870 mc. maser output to produce a beat frequency of 30 mc. from mixer 18; and klystron 33 is tuned to produce a frequency of 23,950 mc. which, as explained above, is the passive mode oscillation applied to the cavity of maser 10. With these initial frequencies, the IF beat note derived from second mixer 40 is 50 mc. Now, if for any reason the maser cavity should be detuned by 1 mc. due to temperature changes, for example, then the maser output of 23,870 mc. will vary only by 1 kc. and as a result klystron 16 will phase-lock to a frequency of 23,900.001 mc. The passive oscillation mode however will change by 1 mc. and, as a result, klystron 33 will be frequency-locked to a frequency of 23,951 megacycles so that the output from mixer 40 will now be 50.999 mc. instead of 50 mc. This 50.999 mc. frequency is applied to frequency discriminator 42 which provides an error signal in a direction which will correct the tuning of maser cavity 10 such that the active frequency maser output thereof is returned to 23,870 mc. and the initial frequency conditions are stabilized.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A circuit for controlling the tuning element of a maser type oscillator cavity resonator to stabilize the active oscillation mode therefrom at its characteristic emission line frequency comprising: a first and second microwave oscillator generating respective frequencies in the range of said emission line frequency; means for maintaining the frequency output of said first oscillator in phase-lock with the active oscillation mode of said maser such that when phase-lock is achieved the first oscillator frequency differs from the active maser frequency by a first prescribed IF frequency; means for maintaining the frequency output of said second oscillator in frequency-lock with a passive oscillator mode in said resonator; and means in circuit with said tuning element and responsive to the heterodyned output of said first and second oscillator frequencies whereby there is produced an error signal when the heterodyned output frequency deviates from a second prescribed IF frequency which is produced only when the active maser oscillation is at its characteristic emission line frequency, said error signal being in a direction to correct the tuning of said maser cavity such that its active oscillation mode is exactly at the emission line frequency.

2. The circuit in accordance with claim 1 wherein the passive mode frequency is close to but higher than said emission line frequency.

3. A circuit for controlling the tuning element of a maser type oscillator cavity resonator to stabilize the active oscillation therefrom at its characteristic emission line frequency comprising: a first and second microwave oscillator generating respective frequencies in the range of said emission line frequency; means responsive to the heterodyned output of the active maser oscillation frequency and the output of said first oscillator for maintaining the first oscillator frequency at a value which differs from the active maser oscillation frequency by a first prescribed IF frequency in phase-lock with the active maser oscillation frequency; means responsive to a passive mode oscillation within said resonator close to the active oscillation mode and in circuit with said second oscillator for maintaining the second oscillator in frequency-lock with the passive mode frequency; means in circuit with the tuning element of said cavity resonator and responsive to the heterodyned output of said first and second oscillator frequencies whereby there is produced an error signal when the heterodyned output frequency deviates from a second prescribed IF frequency which is produced only when the active maser oscillation is at its characteristic emission line frequency, said error signal being in a direction to correct the tuning of said maser cavity such that its active output is exactly at the emission line frequency.

4. The circuit in accordance with claim 3 wherein said last mentioned means comprises a mixer responsive to the outputs of said first and second oscillators, a frequency discriminator responsive to the output of said mixer and adapted to produce an error signal only when the frequency output of said mixer deviates from a second prescribed IF frequency which is produced only when the active maser oscillation is at its characteristic emission line frequency, and a servo system having its output in circuit with said tuning element and responsive to said error signals.

5. A circuit for controlling the tuning element of a maser type oscillator cavity resonator to stabilize the active oscillation therefrom at its characteristic emission line frequency comprising: a first and second microwave oscillator generating respective frequencies in the range of said emission line frequency; means for heterodyning the maser active oscillation frequency and the output of said first microwave oscillator to produce a first prescribed IF frequency; a reference oscillation source adapted to generate said first prescribed IF frequency; means in circuit with the output of said first oscillator and responsive to the phase difference between the IF frequency derived from said heterodyning means and said reference IF frequency whereby the frequency output of said first oscillator is phase-locked to the active maser frequency such that the heterodyned output is maintained at said first prescribed IF frequency in the event that the active maser frequency drifts from said emission line frequency; means responsive to a passive mode oscillation within said resonator close to the active oscillation mode and in circuit with the said second oscillator for maintaining the second oscillator in frequency-lock with the passive mode frequency; and means in circuit with said tuning element and responsive to the heterodyned output of said first and second oscillator frequencies whereby there is produced an error signal when the heterodyned output frequency deviates from a second prescribed IF frequency which is produced only when the active maser oscillation is at its characteristic emission line frequency, said error signal being in a direction to correct the tuning of said maser cavity such that its active oscillation is exactly at the emission line frequency.

6. A circuit for controlling the tuning element of a maser type cavity resonator to stabilize the active oscillation therefrom at its characteristic emission line frequency comprising: a first and second microwave oscillator generating respective frequencies in the range of said emission line frequency; means for maintaining the frequency output of said first oscillator in phase-lock with the active oscillation mode of said maser such that when phase-lock is achieved, the first oscillation frequency differs from the active maser frequency by a first prescribed IF frequency; means for maintaining the frequency output of said second oscillator in frequency-lock with a passive oscillator mode in said resonator, said passive mode frequency being higher than said emission line frequency; a mixer for heterodyning the output frequencies of said first and second oscillators to produce a second IF frequency; a frequency discriminator responsive to the output of said mixer and adapted to produce an error signal only when the second IF frequency differs from a prescribed IF frequency which corresponds to the IF frequency output derived from said mixer when the active maser oscillation is at its characteristic emission line frequency; and a servo system responsive to said error signal and in circuit with the tuning element, said error signal being in a direction to correct the tuning of said maser cavity such that its active oscillation mode is exactly at the emission line frequency.

7. A circuit for controlling the tuning element of a maser type cavity resonator to stabilize the active oscillation frequency therefrom at its characteristic emission line frequency comprising: a first and second microwave oscillator generating respective frequencies in the range of said emission line frequency; means responsive to the heterodyned output of the active maser oscillation frequency for maintaining said first oscillator frequency at a value which differs from the active maser oscillation frequency by a first prescribed IF frequency in phase-lock with the active oscillation frequency; means responsive to a passive mode oscillation within said resonator close to the active oscillation mode and in circuit with the second oscillator for maintaining the output of the second oscillator in frequency-lock with the passive mode frequency; a mixer for heterodyning the output frequency of said first and second oscillator to produce a second IF frequency; a frequency discriminator responsive to the output of said mixer and adapted to produce an error signal only when the second IF frequency differs from a prescribed IF frequency which corresponds to the IF frequency output derived from said mixer when the active maser oscillation is at its characteristic emission line frequency; and a servo system responsive to said error signal and in circuit with said tuning element, said error signal being in a direction to correct the tuning of said maser cavity such that its active oscillation frequency is exactly at the emission line frequency.

8. A circuit for controlling the tuning element of a maser type cavity resonator to stabilize the active oscillation frequency therefrom at its characteristic emission line frequency comprising: a first and second microwave oscillator generating respective frequencies in the range of said emission line frequency; means for heterodyning the maser active oscillation frequency and the output of said first microwave oscillator to produce a first prescribed IF frequency; a reference oscillation source adapted to generate said first prescribed IF frequency; means in circuit with the output of said first oscillator and responsive to the phase difference between the IF frequency derived from said heterodyning means and said reference IF frequency whereby the output of said first oscillator is phase-locked to the active maser frequency such that the heterodyned output is maintained at said first prescribed IF frequency in the event that the active maser frequency drifts from said emission line frequency; means responsive to a passive mode oscillation within said resonator close to the active oscillation mode and in circuit with said second oscillator for maintaining the second oscillator frequency in frequency-lock with the passive mode frequency; a mixer for heterodyning the output frequencies of said first and second oscillators to produce a second IF frequency; a frequency discriminator responsive to the output of said mixer and adapted to produce an error signal only when the second IF frequency differs from a prescribed IF frequency which corresponds to the IF frequency derived from said mixer wherein the active maser oscillation is at the characteristic emission line frequency; and a servo system responsive to said error signal and in circuit with said tuning element, said error signal being in a direction to correct the tuning of said maser cavity such that its active oscillation mode is exactly at the emission line frequency.

9. The circuit in accordance with claim 8 wherein the first and second oscillators are kylstron type oscillators.

No references cited.